United States Patent [19]

Cole

[11] Patent Number: 4,637,300

[45] Date of Patent: Jan. 20, 1987

[54] FILTER ASSEMBLY FOR AN EXHAUST STACK

[75] Inventor: James Cole, Flushing, Mich.

[73] Assignee: Dee Cramer, Inc., Flint, Mich.

[21] Appl. No.: 794,738

[22] Filed: Nov. 4, 1985

[51] Int. Cl.[4] .............................................. F01B 31/14
[52] U.S. Cl. .......................................... 98/60; 55/502;
       126/285 R; 126/307 R
[58] Field of Search ................. 98/58, 60; 126/285 R,
       126/307, 299 D; 55/502

[56] References Cited

U.S. PATENT DOCUMENTS

| | | | |
|---|---|---|---|
| 2,486,251 | 10/1949 | Braun | 98/115.2 |
| 2,583,489 | 1/1952 | Meyer | 98/115.2 |
| 2,792,906 | 5/1957 | Evans | 55/502 |
| 3,354,622 | 11/1967 | Murphy, Jr. | 55/502 |
| 3,693,328 | 9/1972 | Paucha | 55/502 |
| 3,807,291 | 4/1974 | Roberts et al. | 98/115.2 |
| 3,955,949 | 5/1976 | Rohrer | 126/299 D |
| 4,250,609 | 2/1981 | Beaudoin | 126/307 R |
| 4,279,629 | 7/1981 | Simms | 126/285 R |
| 4,493,718 | 1/1985 | Wchweizer | 55/491 |
| 4,498,913 | 2/1985 | Tank et al. | 55/356 |

Primary Examiner—Ronald C. Capossela
Attorney, Agent, or Firm—Gifford, Groh, VanOphem, Sheridan, Sprinkle & Dolgorukov

[57] ABSTRACT

A filter assembly for an exhaust stack having a housing defining an interior chamber and an inlet and an outlet which are connected in series with the exhaust stack. A mounting frame is secured diagonally within the interior of the housing so that the mounting frame is interposed between the inlet and outlet of the housing. A plurality of filter elements are detachably secured to the mounting frame so that influent into the housing inlet passes through the filter elements prior to exhaust out through the housing outlet and to the atmosphere. The filter assembly is easily retrofitted to existing systems.

8 Claims, 7 Drawing Figures

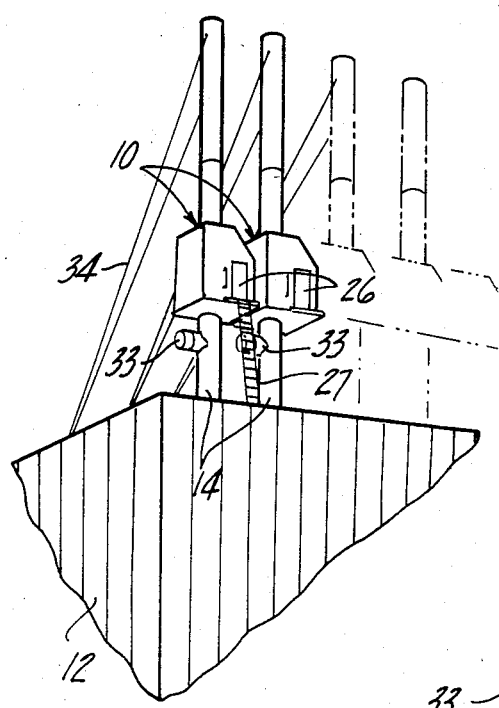
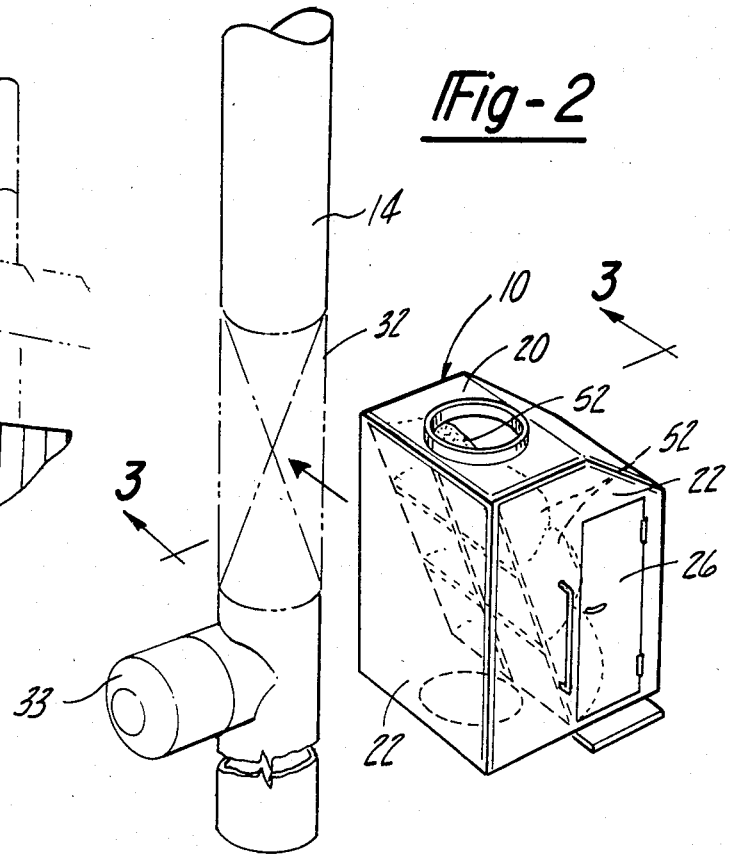
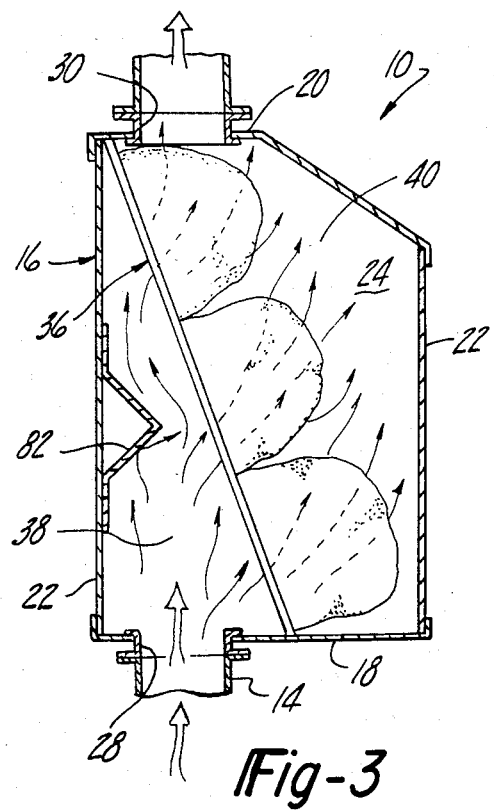

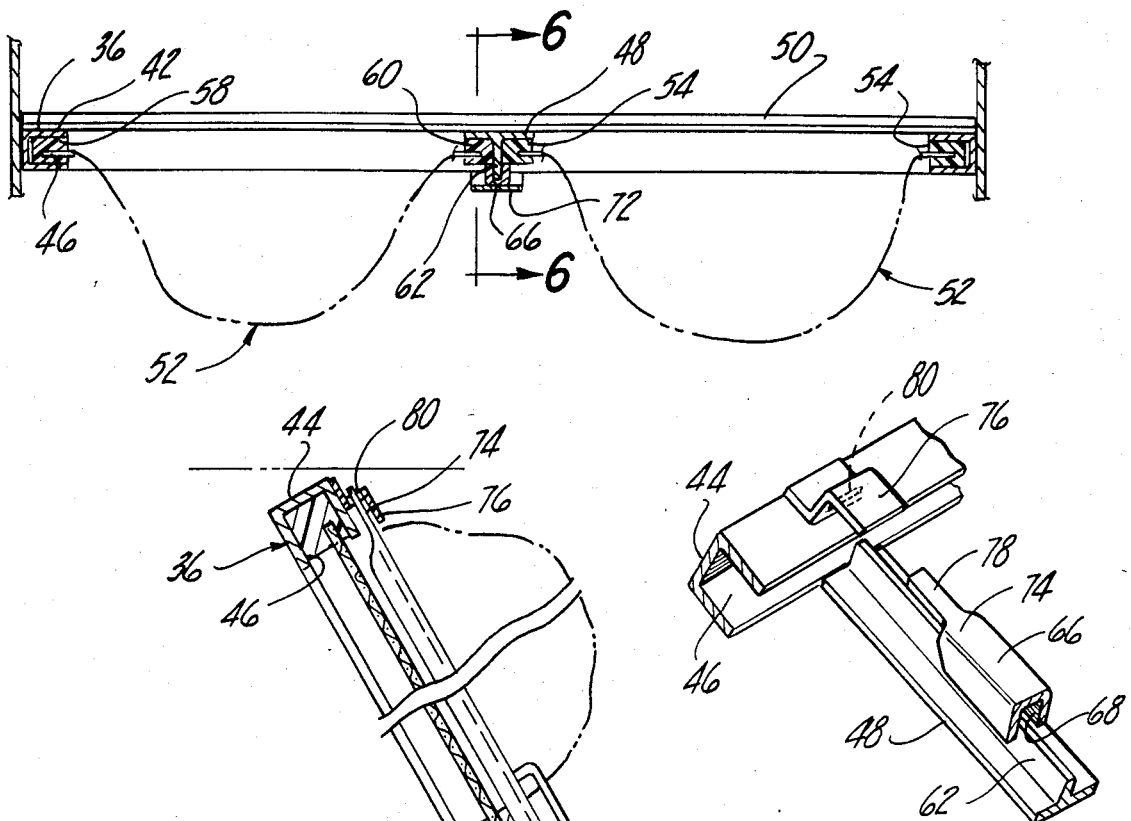
*Fig-5*
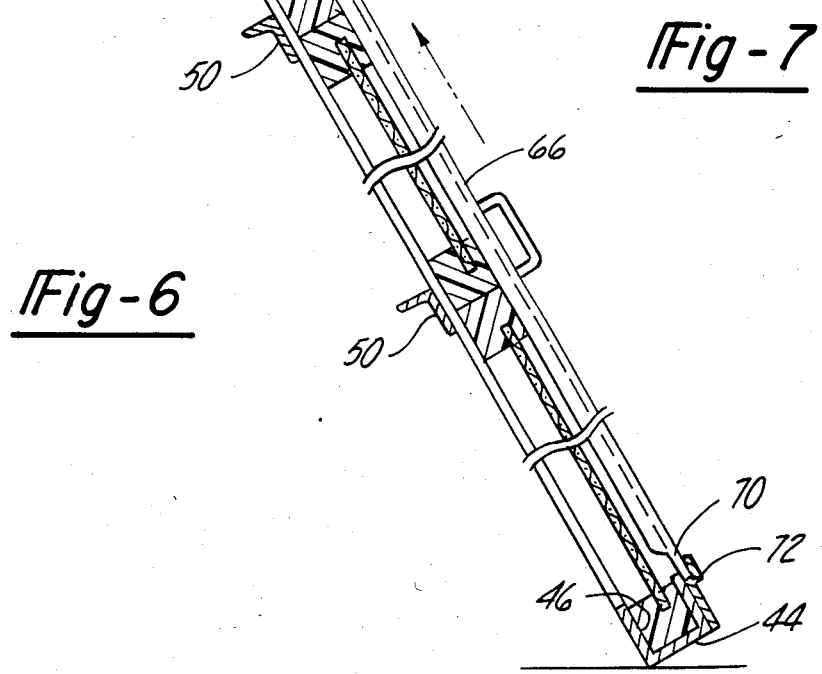
*Fig-7*
*Fig-6*

FILTER ASSEMBLY FOR AN EXHAUST STACK

BACKGROUND OF THE INVENTION

I. Field of the Invention

The present invention relates generally to filter assemblies and, more particularly, to a filter assembly for an exhaust stack.

II. Description of the Prior Art

In paint spray booths of the type used in industrial operations, articles to be painted are moved within the booth and then spray painted. The air within the booth rapidly becomes contaminated with paint particles which must be removed from the paint spray booth not only to protect other articles in the paint spray booth from contamination but also for health reasons.

Typically, the air contaminated with paint particles is evacuated from the paint spray booth and passed through an eliminator section or an air scrubber which removes most of the paint particles from the air. The partially cleaned air is then exhausted from the paint spray booth through one or more exhaust stacks.

Recently the paints which have been developed and especially those used in the automotive industry have caused a problem. Air scrubbers which were heretofore satisfactory will not effectively remove the new paints from the air. There have been instances in which paint exhausted from spray booths has been deposited on automobiles and homes several miles from the factory.

SUMMARY OF THE PRESENT INVENTION

The present invention provides a filter assembly for an exhaust stack which overcomes the above-mentioned disadvantages.

In brief, the filter assembly of the present invention comprises a housing defining an interior chamber and having an inlet and an outlet which are positioned on opposite ends of the housing. The housing is then secured to the exhaust stack so that its inlet and outlet are connected in series with the exhaust stack.

A mounting frame is secured within the interior of a housing so that the mounting frame extends diagonally across the interior of the housing and divides the housing chamber into an inlet chamber open to the housing inlet and an outlet chamber open to the housing outlet. Consequently, the fluid flow from the exhaust stack passes into the housing chamber, through the mounting frame and ultimately exhausts out through the housing outlet and to the atmosphere.

At least one and preferably several filter elements each comprise filter media having a frame around its outer periphery. The filter element frames are detachably secured to the mounting frame so that fluid flow passing through the mounting frame passes through the filter media thereby removing any remaining paint particles in the exhaust air from the paint spray booth. When the filter media becomes clogged with paint particles, the filter elements are removed and either cleaned or replaced with new filter elements.

Existing exhaust stacks can be readily modified to accept the filter assembly of the present invention so that existing paint systems can be retrofitted to accommodate the new paints which have been developed.

BRIEF DESCRIPTION OF THE DRAWING

A better understanding of the present invention will be had upon reference to the following detailed description when read in conjunction with the accompanying drawings, wherein like reference characters refer to like parts throughout the several views, and in which:

FIG. 1 is a fragmentary perspective view illustrating a preferred embodiment of the present invention;

FIG. 2 is an exploded fragmentary perspective view illustrating the preferred embodiment of the present invention;

FIG. 3 is a cross-sectional view taken substantially along line 3—3 in FIG. 2;

FIG. 4 is an exploded view illustrating a portion of the preferred embodiment of the present invention;

FIG. 5 is a cross-sectional view taken substantially along line 5—5 in FIG. 4 and enlarged for clarity;

FIG. 6 is a cross-sectional view taken substantially along line 6—6 in FIG. 5; and FIG. 7 is a fragmentary perspective view illustrating a portion of the preferred embodiment of the invention.

DETAILED DESCRIPTION OF A PREFERRED EMBODIMENT OF THE INVENTION

With reference first to FIG. 1, a preferred embodiment of the filter assembly 10 of the present invention is thereshown mounted within an existing exhaust stack 14. Each exhaust stack 14 is intended to exhaust air from a paint spray booth (not shown) inside the manufacturing plant 12.

With reference now to FIGS. 2 and 3, the filter assembly 10 comprises a housing 16 having a bottom wall 18, top wall 20 and side walls 22 which, together, define a housing chamber 24. An access door 26 (FIG. 2) is mounted to one side 22 of the housing 16 to provide access to the housing chamber 24 for a reason to be subsequently described. A ladder 27 (FIG. 1) can be provided to reach the door 26. In addition, the housing 16 can be constructed of any conventional material, such as sheet metal.

Still referring to FIGS. 2 and 3, the housing 16 includes an inlet 28 on its bottom wall 18 and an outlet 30 on its top wall 20. The inlet 28 and outlet 30 are coaxial with each other and are of the same cross-sectional shape as the exhaust stack 14.

The present invention is directed to a structure and a method for modifying existing exhaust stacks 14 which prior to modification are constructed like the exhaust stacks 14 shown in FIG. 2. In order to mount the housing 16 to the exhaust stack 14, a section 32 (FIG. 2) of the existing exhaust stack 14 above the existing exhaust motor and fan assembly 33 is first removed and the housing 16 is positioned in series with the exhaust stack 14 in place of the removed section 32. Consequently, the housing chamber 24 is positioned in series with the exhaust stack 14 so that influent from the exhaust stack 14 first passes through the housing inlet 28, through the housing chamber 24 and out through the housing outlet 30. Any conventional means, such as welding, is used to secure the housing 16 in series with the exhaust stack 14 and preferably guy wires 34 (FIG. 1) or the like are then used to support the exhaust stack 14 to the manufacturing plant 12.

It should be noted that in many installations it will not be necessary to remove the section 32 and it will only be necessary to cut the exhaust stack 14 and place the housing 16 on top of the lower portion of the stack 14. The upper section of the stack 14 would then be mounted to outlet 30.

With reference now to FIGS. 3 and 4, a generally rectangular mounting frame 36 is secured within the housing chamber 24 so that the mounting frame 36 extends diagonally through the housing chamber 24. In doing so, the mounting frame 36 divides the housing chamber 24 into an inlet chamber 38 open to the inlet 28 and an outlet chamber 40 which is open to the housing inlet 30. In addition, the mounting frame 36 is positioned within the housing chamber 24 so that the door 26 is open to the outlet chamber 40.

As best shown in FIGS. 4–6, the mounting frame 36 comprises a pair of side struts 42 and end struts 44 so that the mounting frame 36 is generally rectangular in shape. Furthermore, each strut 42 and 44 includes a U-shaped channel 46 so that the channels 46 face toward each other and thus face into the interior of the mounting frame 36. An elongated support 48 extends longitudinally between the end struts 44 midway between and parallel to the side struts 42 and is secured to the end struts 44 in any conventional fashion. In addition, a pair of laterally extending cross brackets 50 extend in between the side struts 42 and are spaced apart from each other.

With reference still to FIGS. 4–6, the filter assembly 10 further comprises at least one and preferably a plurality of filter elements 52 which are detachably secured to the mounting frame 36 in a fashion to be subsequently described. Each filter element 52 includes a generally rectangular outer frame 54 and filter media 56 secured across the filter element frame 54. The filter element frame 54, moreover, is dimensioned so that one side 58 (FIG. 5) is slidably received within the U-shaped channel 46 on the mounting frame 36 while its other or inner side 60 abuts against the supports 48 and 50. Preferably six or eight filter elements 52 are attached to the mounting frame 36 so that the filter elements 52 completely cover the mounting frame 36. As shown in the drawing, the filter elements 52 are preferably arranged in two rows (FIG. 5) and the inner or adjacent edges 60 of the filter element frames 54 are separated from each other by a rib 62 protruding outwardly from the support 48.

With reference to FIGS. 5–7, in order to secure the inner or adjacent sides 60 of the filter element frames 54 to the mounting frame 36, and thus secure the filter elements 52 to the mounting frame 36, an elongated locking bar 66 includes a U-shaped channel 68 which is positioned over the rib 62 on the support member 48. The locking bar 66 is adapted to abut against the inner side 60 of the filter element frame 54 to sandwich the inner sides 60 in between the locking bar 66 and the support 48. A lower end 70 (FIG. 6) of the locking bar 66 is slidably positioned within a bracket 72 while an upper end 74 of the locking bar 66 is detachably secured to the mounting frame 36 by another bracket 76. Preferably, the locking bar 66 includes a nose 78 at its upper end 74 which is positioned through a receiving slot 80 in the bracket 76 in order to securely attach the locking bar 66 to the mounting frame 36.

In operation, an existing exhaust stack is preferably retrofitted by removing the section 32 and placing the housing 16 between the upper and the lower portions of the exhaust stack 14 in the manner shown in FIGS. 2 and 3. The filter elements 52 are then positioned on the mounting frame 36 and locked in place by the locking bar 66. In doing so, the filter elements 52 completely cover the mounting frame 36 so that all fluid flow through the exhaust stack 14 and into the inlet chamber 38 passes through the mounting frame 36, and thus through the filter elements 52 prior to exhausting from the outlet 30 to the atmosphere. Preferably, a deflector 82 (FIG. 3) within the inlet chamber 38 deflects the influent towards the mounting frame 36 so that the exhaust flow through the mounting frame 36, and thus through the filter elements 52, is substantially evenly distributed.

The media 56 of the filter elements 52 effectively removes paint particles or the like which may be entrained within the exhaust gas flowing through the exhaust stack 14. When the media 56 becomes clogged with paint particles or the like, the filter elements 52, which are accessible through the door 26, are then simply replaced with clean filter elements, or alternatively, cleaned and replaced.

Although the present invention has been described for use in conjunction with a paint spray booth, it will be understood that the filter assembly of the present invention can be also used with other types of exhaust systems.

From the foregoing, it can be seen that the present invention provides a simple, inexpensive and yet totally effective means for removing entrained particles from the exhaust gases in an industrial operation.

While the invention has been described as a means of retrofitting existing exhaust systems to make them useful with the new paints that are being used, it should also be understood that the filter assembly of the present invention could be used as a part of a completely new paint exhaust system.

Having described my invention, however, many modifications thereto will become apparent to those skilled in the art to which it pertains without deviation from the spirit of the invention as defined by the scope of the appended claims.

I claim:

1. A filter assembly for an exhaust stack comprising:
   a housing defining an interior chamber, said housing having an inlet and an outlet connected in series with the exhaust stack, said inlet and outlet being positioned on opposite ends of said housing,
   a substantially planar mounting frame secured within said housing chamber so that a plane of said mounting frame extends diagonally across said housing chamber, said mounting frame extending entirely across said housing chamber so that said frame is interposed between said inlet and said outlet,
   at least one filter element for removing particulate matter from air flow, and
   means for detachably securing said at least one filter element to said mounting frame so that substantially all of the air flow from said inlet and to said outlet passes through said filter.

2. The invention as defined in claim 1 wherein said inlet and outlet are axially aligned with each other.

3. The invention as defined in claim 1 wherein said at least one filter element comprises a plurality of filter elements.

4. The invention as defined in claim 3 wherein each filter element comprises filter media and a filter element frame around the outer periphery of said filter media, and wherein said detachable securing means comprises means for detachably securing said filter element frames to said mounting frame.

5. The invention as defined in claim 4 wherein said detachable securing means comprises means on said mounting frame for slidably receiving one side of said filter element frame, a locking bar, and means for detachably securing said locking bar to said mounting frame so that a side of said filter element opposite from said one side is sandwiched in between said locking bar and a portion of said mounting frame.

6. The invention as defined in claim 5 wherein said filter elements are arranged in two rows so that said second sides of the filter element frames in said rows are closely adjacent each other, and wherein said locking bar abuts against said second sides of said filter element frames in both rows.

7. The invention as defined in claim 5 wherein said receiving means comprises an elongated strut having a U-shaped channel dimensioned to receive said one side of said filter element frame.

8. The invention as defined in claim 1 wherein said mounting frame divides said housing chamber into an inlet chamber and an outlet chamber and comprising means in said inlet chamber for deflecting influent from said inlet toward said mounting frame.

* * * * *